(12) United States Patent
Schiessl

(10) Patent No.: US 10,895,630 B2
(45) Date of Patent: Jan. 19, 2021

(54) ELECTROMAGNETIC IMAGING SYSTEM AND METHOD FOR OPERATING AN ELECTROMAGNETIC IMAGING SYSTEM

(71) Applicant: Rohde & Schwarz GmbH & Co. KG, Munich (DE)

(72) Inventor: Andreas Schiessl, Munich (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 274 days.

(21) Appl. No.: 16/022,011

(22) Filed: Jun. 28, 2018

(65) Prior Publication Data
US 2020/0003863 A1 Jan. 2, 2020

(51) Int. Cl.
*G01S 13/88* (2006.01)
*G01S 7/02* (2006.01)
*G01S 13/89* (2006.01)

(52) U.S. Cl.
CPC ............ *G01S 7/021* (2013.01); *G01S 13/887* (2013.01); *G01S 13/89* (2013.01)

(58) Field of Classification Search
CPC .... G01S 11/06; G01S 13/0209; G01S 13/887; G01S 13/89; G01S 7/021
See application file for complete search history.

(56) References Cited

U.S. PATENT DOCUMENTS

| | | | |
|---|---|---|---|
| 6,316,758 B1 | 11/2001 | Ubowski et al. | |
| 6,901,064 B2 | 5/2005 | Cain et al. | |
| 8,107,557 B2 | 1/2012 | Lindenmeier et al. | |
| 2006/0240777 A1 | 10/2006 | Ruuska | |
| 2015/0355314 A1* | 12/2015 | Handa | G01S 3/74 342/22 |

FOREIGN PATENT DOCUMENTS

DE   10 2007 017 478 A1   10/2008

\* cited by examiner

*Primary Examiner* — Timothy A Brainard
(74) *Attorney, Agent, or Firm* — Christensen O'Connor Johnson Kindness PLLC

(57) ABSTRACT

An electromagnetic imaging system for creating an image of an object is disclosed. The electromagnetic imaging system comprises at least one transmit antenna, multiple receive antennas, a control unit, a processing unit, and an interference detection unit. The at least one transmit antenna is configured to generate radiofrequency signals with at least one planned frequency at several planned times. The multiple receive antennas are configured to receive radiofrequency signals and to generate a corresponding measurement signal. The control unit is configured to control at least the multiple transmit antennas. The processing unit is configured to process the measurement signal into the image of the object. The interference detection unit is configured to detect and analyze an interference signal in the measurement signal, and the interference detection unit is connected to the control unit in a signal transmitting manner so as to control the control unit. Moreover, a method for operating an electromagnetic imaging system is disclosed.

20 Claims, 2 Drawing Sheets

ELECTROMAGNETIC IMAGING SYSTEM AND METHOD FOR OPERATING AN ELECTROMAGNETIC IMAGING SYSTEM

FIELD OF THE DISCLOSURE

Embodiments of the present disclosure relate generally to an electromagnetic imaging system as well as to a method for operating an electromagnetic imaging system.

BACKGROUND

Electromagnetic imaging systems are used to create images of objects, whereby electromagnetic waves are generated and forwarded to an object and electromagnetic waves originating from the object are received via receive antennas afterwards. For the imaging procedure, a large variety of frequencies may be used.

However, there may be sources of interference radiation that may operate in a frequency range similar to that employed by the electromagnetic imaging system, for example telecommunication technologies use frequencies that correspond to the ones used by the electromagnetic imaging systems, for instance the new 5G telecommunication standard. The interference radiation may thus disturb or even completely hinder the imaging procedure.

Known solutions to this problem are either to ensure that the environment of the electromagnetic imaging system is virtually free of interference radiation or to restrict the electromagnetic frequencies used to certain frequency bands that are exclusively licensed for this purpose. However, these known solutions are expensive.

Accordingly, there is a need for an electromagnetic imaging system as well as a method for operating an electromagnetic imaging system that is capable of reliably operating in the presence of interference radiation in a cost-efficient manner.

SUMMARY

Embodiments of the present disclosure provide an electromagnetic imaging system for creating an image of an object. In some embodiments, the electromagnetic imaging system comprises at least one transmit antenna, multiple receive antennas, a control unit, a processing unit, and an interference detection unit. The at least one transmit antenna is configured to generate radio frequency signals with at least one planned frequency at several planned times. The multiple receive antennas are configured to receive radio frequency signals and to generate a corresponding measurement signal. The control unit is configured to control at least the at least one transmit antenna. The processing unit is configured to process the measurement signal into the image of the object. The interference detection unit is configured to detect and analyze an interference signal in the measurement signal, and the interference detection unit is connected to the control unit in a signal transmitting manner so as to control the control unit.

With the electromagnetic imaging system according to the present disclosure, the presence of interference radiation can be detected and the corresponding interference signal can be analyzed. For example, the interference detection unit may be configured to analyze whether the interference signal is harmful for an imaging procedure via the electromagnetic imaging system or may just be ignored. For doing so, the interference detection unit may check the frequency of the interference signal detected. Based on the analysis of the interference signal, the interference detection unit controls the control unit, which in turn may adjust operational parameters of at least the at least one transmit antenna, for example the electromagnetic imaging system. This way, the electromagnetic imaging system may be operated in spite of the presence of interference radiation, albeit with altered operational characteristics.

The measurement signal corresponds to the signal that is internally processed by the electromagnetic imaging system wherein the measurement signal is obtained by converting the electromagnetic waves received by the receive antennas.

The electromagnetic imaging system may be configured to create images of persons and/or of baggage, for example for the purpose of finding forbidden hidden objects such as drugs, weapons and/or explosives. For example, the electromagnetic imaging system may be a so-called body scanner, which may be used for security checks at e.g., airports, at the entrance of buildings, country borders or the like.

The control unit and the processing unit may correspond to a single device having both functionalities, namely controlling the at least one transmit antenna as well as processing the measurement signal.

The electromagnetic imaging system may comprise multiple transmit antennas, each being configured to generate radio frequency signals with at least one planned frequency at several planned times.

According to one aspect, the control unit is configured to at least one of delay an imaging procedure, replan an imaging procedure, reschedule an imaging procedure and exclude results of an imaging procedure based on a control signal received from the interference detection unit. Thereby, the term replan is to be understood to include changing operational characteristics of the electromagnetic imaging system, for example changing a frequency and/or a power level of the radio frequency signal generated by the at least one transmit antenna. Put in other words, if the interference detection unit detects an interference signal that is capable of considerably disturbing the imaging procedure, operational characteristics for the imaging procedure are changed such that the effect of the interference signal on the image created is minimized. For example, the imaging procedure is delayed until the interference signal is gone or weak enough to not further considerably disturb the imaging procedure. In another example, the frequency of the generated radio frequency signals may be adapted to substantially differ from a frequency of the interference signal, such that the interference signals influence on the imaging procedure is attenuated. In yet another example, parts of the measurement signal that are found to be corrupted by an interference signal are not taken into account by the processing unit when processing the measurement signal into the image of the object. Alternatively or additionally, the power level of the generated radio frequency signal may be enhanced to significantly exceed a power level of the interference signal.

According to a further aspect, the interference detection unit is configured to determine a power of the interference signal. For example, the interference detection unit is configured to determine whether the power of the interference signal is large enough to considerably disturb the imaging procedure. Based on this analysis, the interference detection unit may be configured to change operational characteristics of the electromagnetic imaging system or to ignore the interference signal.

In a certain embodiment of the present disclosure, the interference detection unit is configured to determine whether the power of the interference signal exceeds a certain power level. The certain power level may be a threshold up to which interference signals do not considerably disturb the imaging procedure. Alternatively or additionally, the certain power level may be a threshold above which other components of the electromagnetic imaging system may get saturated with electromagnetic energy and/or damaged, for instance an amplifier such as a low-noise amplifier.

The interference detection unit may comprise a diode that is used for determining whether the power of the interference signal exceeds a certain power level.

In another embodiment of the present disclosure, the interference detection unit is configured to compare the frequency of the interference signal with at least one of the at least one planned frequency and an internally used intermediate frequency corresponding to the at least one planned frequency. The internally used intermediate frequency is the frequency which results from mixing the measurements signal with an internal oscillator signal of a predetermined frequency in a mixer stage of the electromagnetic imaging system downstream of the multiple receive antennas. The result is a modulated measurement signal with a frequency equal to the absolute value of the difference of the frequencies of the measurement signal and the internal oscillator. Therefore, there are at least two frequency ranges which may disturb the imaging procedure, namely a frequency range around the at least one planned frequency and a frequency range around the internally used intermediate frequency. In other words, the interference detection unit is configured to detect, whether there are interference signals in the relevant frequency bands.

The interference detection unit may comprise at least one detector being configured to detect at least one characteristic of the interference signal. The term "characteristic" is to be understood to include properties like frequency and/or power level, etc.

In a further aspect of the present disclosure, the at least one detector is provided in a radio frequency portion of the electromagnetic imaging system. For example, the detector is provided in a so-called front end of the electromagnetic imaging system, which is commonly defined as the part between the multiple receive antennas and the above mentioned mixer stage (where the radio frequency signal is modulated with the oscillator signal), with the mixer stage included. For example, the at least one detector is configured to detect and analyze an interference signal in a frequency range around the at least one planned frequency.

According to another embodiment of the present disclosure, the at least one detector is provided in an intermediate frequency portion of the electromagnetic imaging system. For example, the at least one detector is provided downstream of the above mentioned mixer stages. The at least one detector thus may be configured to detect and analyze an interference signal in a frequency range around the internally used intermediate frequency.

In a particular embodiment according to the present disclosure, the control unit is configured to change the at least one planned frequency. For example, the control unit is configured to adapt the frequency of the generated radio frequency signals to substantially differ from a frequency of the interference signal, such that the interference signal's influence on the imaging procedure is attenuated.

According to another aspect, the at least one planned frequency lies within the microwave frequency band. For example, the at least one planned frequency lies in the range of 1 GHz to 100 GHz, for example in the range of 10 GHz to 40 GHz. These frequency ranges are particularly suitable for detecting hidden objects.

For instance, the at least one planned frequency lies within the frequency band assigned to the new telecommunication standard 5G.

The at least one transmit antenna may be configured to also receive radio frequency signals, at least in an operational mode where the transmit antenna does not generate a radio frequency signal. The transmit antenna may also be configured to generate a measurement signal corresponding to the received radio frequency signal.

For example, the electromagnetic imaging system is configured to perform the methods described in the following.

Embodiments of the present disclosure also provide a method for operating an electromagnetic imaging system for creating an image of an object, comprising at least one transmit antenna being configured to generate radio frequency signals with at least one planned frequency at several planned times, comprising multiple receive antennas being configured to receive radio frequency signals and to generate a corresponding measurement signal, a control unit being configured to control at least the at least one transmit antenna, a processing unit being configured to process the measurement signal into the image of the object, and an interference detection unit being configured to detect and analyze an interference signal in the measurement signal, and the interference detection unit being connected to the control unit in a signal transmitting manner so as to control the control unit. The method comprises the following steps:

receiving radio frequency signals via at least one of the multiple receive antennas and generating a corresponding measurement signal;

detecting and analyzing an interference signal in the measurement signal by using the interference detection unit; and at least one of delaying an imaging procedure, replanning an imaging procedure, rescheduling an imaging procedure and/or excluding results of an imaging procedure based on properties of the interference signal detected by using the processing unit.

Regarding the advantages, reference is made to the explanations given above which apply mutatis mutandis to the method.

According to one embodiment of the present disclosure, the step of detecting an interference signal is repeated with a frequency corresponding to an intermediate frequency internally used by the electromagnetic imaging system. In other words, it is checked whether there is an interference signal in a frequency range around the internally used intermediate frequency, which may disturb the imaging procedure downstream of the mixer stages.

According to another aspect, a power level of the interference signal is determined and compared to a power level threshold. The power level threshold may be a threshold up to which interference signals do not considerably disturb the imaging procedure. Alternatively or additionally, the power level threshold may be a threshold above which other components of the electromagnetic imaging system may get saturated with electromagnetic energy and/or damaged, for instance an amplifier such as a low-noise amplifier.

In a further aspect, a frequency of the interference signal is determined and compared with at least one of the at least one planned frequency and an internally used intermediate frequency corresponding to the at least one planned frequency. There are at least two frequency ranges in which an interference signal may disturb the imaging procedure, namely a frequency range around the at least one planned frequency and a frequency range around the internally used intermediate frequency. In other words, in this step it is detected, whether there are interference signals in the relevant frequency bands or whether the interference signals may be ignored as their frequencies are too different from the relevant frequency bands.

Measurement signals may be discarded which are generated at a time at which an interference signal with certain properties is detected. For example, the measurement signals are discarded only when a relevant interference signal is detected, which means that the frequency of the interference signal lies within a certain range around the at least one planned frequency, the frequency of the interference signal lies within a certain range around the internally used intermediate frequency and/or the power of the interference signal exceeds a certain power level threshold. In other words, image data that is possibly corrupted by the interference signal is discarded. This way, the interference signal is prevented from having a substantial influence on the imaging procedure, for example on the image of the object.

In a certain embodiment of the present disclosure, the interference signal is detected in a radio frequency portion of the electromagnetic imaging system. For example, the interference signal is detected in the front end of the electromagnetic imaging system, as defined above. For example, the interference signal is detected and analyzed in a frequency range around the at least one planned frequency which is the relevant frequency range in the front end of the electromagnetic imaging system.

In another embodiment of the present disclosure, the interference signal is detected in an intermediate frequency portion of the electromagnetic imaging system. For example, the interference signal is detected downstream of the mixer stages. Thus, the interference signal may be detected and analyzed in a frequency range around the internally used intermediate frequency which is the relevant frequency range in the intermediate frequency portion of the electromagnetic imaging system.

According to a further aspect, a first measurement is taken prior to generating radio frequency signals for imaging purposes. Put it another way, it is first checked whether a relevant interference signal is present in the frequency range planned to use for imaging purposes. The imaging procedure is started only if no relevant interference signal is detected in the respective frequency range. Alternatively, if a relevant interference signal is detected, the imaging procedure may be started with altered operational characteristics, for example with altered frequency of the generated radio frequency signal and/or with an enhanced power level of the generated radio frequency signal. Alternatively or additionally, a user or rather controller of the electromagnetic imaging system is informed about the interference signal detected.

The first measurement may be taken in a radio frequency portion of the electromagnetic imaging system in a range around the planned frequency and/or the first measurement may be taken in an intermediate frequency portion of the electromagnetic imaging system in a range around an internally used intermediate frequency corresponding to the planned frequency. Thus, prior to starting the imaging procedure, it is checked whether a relevant interference signal is present in a certain range around the at least one planned frequency and/or in a certain range around the internally used intermediate frequency. Like above, the imaging procedure is started only if no relevant interference signal is detected in either of the relevant frequency ranges. Alternatively, if a relevant interference signal is detected, the imaging procedure may be started with altered operational characteristics, for example with altered frequency of the generated radio frequency signal, with an enhanced power level of the generated radio frequency signal and/or the internally used intermediate frequency may be adapted to substantially differ from the frequency of the interference signal, for example by adapting the predefined oscillator frequency.

According to another aspect, the step of detecting and analyzing the interference signal is repeated with a sampling frequency that is based on a maximum internally used intermediate frequency. By adjusting the sampling frequency, it can be ensured that only a certain maximum number of measurement signals may be corrupted by an interference signal until the interference signal is detected. In some embodiments, the sampling frequency is at least twice as big as the maximum internally used intermediate frequency, such that it is ensured that no corrupted measurement signal remains undetected.

The interference detection unit, for example the one assigned to the intermediate frequency portion, is operated at intervals of under 100 ns, for example 50 ns, so as to avoid loss of more than one measurement. The electromagnetic imaging system typically operates with measurement cycles in the respective range of 100 ns, for instance 50 ns.

For instance, the interference detection unit assigned to the radio frequency portion is active all the time so that a radio frequency blockage check is performed continuously.

In a particular embodiment according to the present disclosure, the control unit is configured to change the frequency of the radio frequency signals generated via the at least one transmit antenna. For example, the control unit is configured to adapt the frequency of the generated radio frequency signals to substantially differ from a frequency of the interference signal, such that the interference signal's influence on the imaging procedure is attenuated.

In one embodiment of the disclosure, the planned frequency lies within the microwave frequency band. For example, the at least one planned frequency lies in the range of 1 GHz to 100 GHz, for example in the range of 10 GHz to 40 GHz. These frequency ranges are particularly suitable for detecting hidden objects.

Generally, the interference detection unit as well as the processing unit use time stamps for providing a comparable time information so that a measurement signal at or near a certain point of time is discarded when an interference is detected at that point of time.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
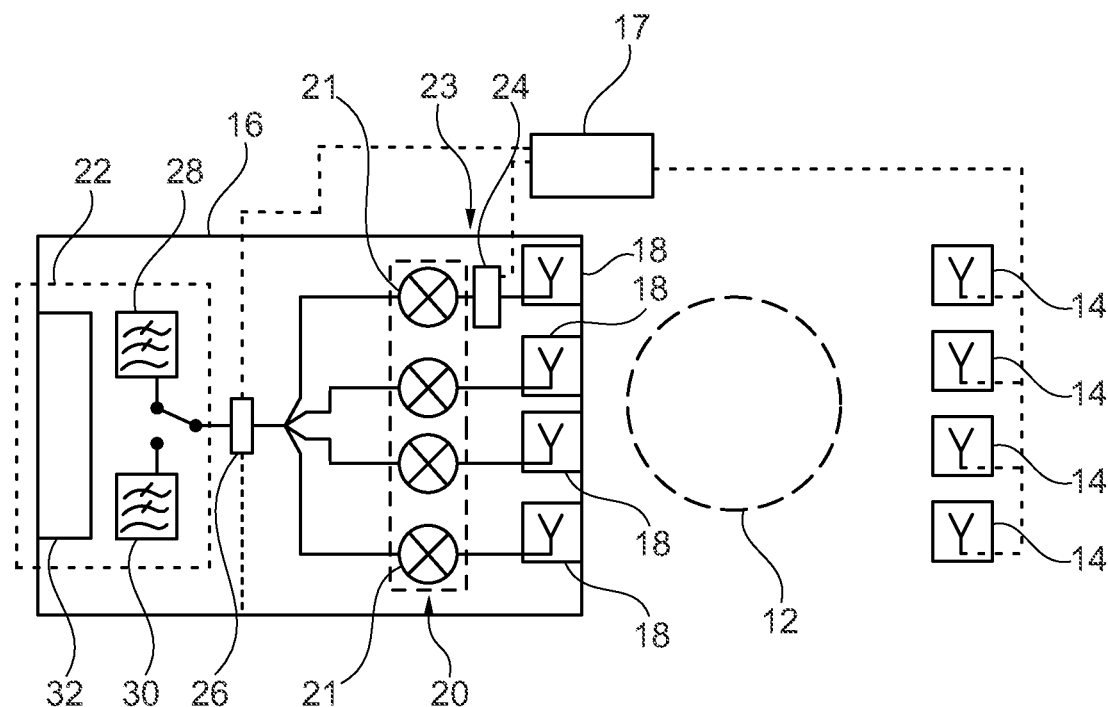
FIG. 1 shows an example of an electromagnetic imaging system according to one or more aspects of the disclosure.

FIG. 1 shows a schematic block diagram of an electromagnetic imaging system 10, which is used for creating an image of an object 12. The object 12 may be at least one of a person and baggage. For example, the electromagnetic imaging system 10 may be used for the purpose of finding forbidden hidden objects such as drugs, weapons and/or explosives. For example, the electromagnetic imaging system 10 is a so-called body scanner, which can be used for security checks at airports, at the entrance of buildings, country borders or the like.

The electromagnetic imaging system 10 comprises multiple transmit antennas 14 being configured to transmit radio frequency signals with at least one predetermined frequency. The at least one predetermined frequency may lie within the microwave range, for example in the range of 1 GHz to 100 GHz, for example in the range of 10 GHz to 40 GHz. For instance, the frequency range corresponds to the one of the 5G telecommunication standard.

A receiving block 16 for receiving radio frequency signals and a control unit 17 for controlling an imaging procedure are provided in the electromagnetic imaging system 10. The receiving block 16 comprises multiple receive antennas 18, a mixer stage 20 with several mixing members 21, for instance local oscillators. Each mixing member 21 is connected to one of the receive antennas 18. Further, a processing unit 22 is connected to the mixer stage 20.

An interference detection unit 23 is also provided which, in the representative embodiment shown in FIG. 1, comprises a first detector 24 and a second detector 26. The first detector 24 is provided in the so-called front end of the receiving block, namely between one of the receive antennas 18, also called receiving antennas, and the allocated mixing member 21. The first detector 24 may be configured, for example via analog circuitry, to process an analog signal. The second detector 26 is provided between the mixing stage 20 and the processing unit 22. The second detector 26 may be configured, for example via digital circuitry, to process a digital signal. Of course, with appropriate D/A and/or A/D convertors or other similar circuitry, the first detector 24 can be configured to process signals in the digital domain, and the second detector can be configured to process signals in the analog domain.

The respective detectors 24, 26, for example the first detector 24 assigned to the front end, may be established by a diode. Of course, several detectors could be provided in the front end of the receiving block 16, for example one detector between each pair consisting of one of the receive antennas 18 and the respectively assigned mixing member 21.

The interference detection unit 23 is connected to the control unit 17 in a signal transmitting manner so as to control the control unit 17 in dependency of a detected interference as will be described later. More precisely, the first detector 24 and the second detector 26 may each be connected to the control unit 17.

The processing unit 22 may comprise a first channel and a second channel, wherein a first bandpass filter 28 is provided in the first channel and a second bandpass filter 30 is provided in the second channel. The processing unit 22 may be switchable between different switch positions, wherein in a first switch position (shown in FIG. 1) the first bandpass filter 28 is connected to the second detector 26 and wherein in a second switch position the second bandpass filter 30 is connected to the second detector 26.

In some embodiments, the first bandpass filter 28 passes frequencies corresponding to a radio frequency signal with frequencies between 10 GHz and 20 GHz, while the second bandpass filter 30 passes frequencies corresponding to a radio frequency signal with frequencies between 20 GHz and 40 GHz. Hence, different frequency bands can be processed appropriately.

Each of the channels is connected to a processing member 32 which is configured to process a signal received via at least one of the bandpass filters 28, 30 into an image of the object 12. In some embodiments, the processing member 32 can include any suitably arranged digital and/or analog circuits, a programmed processor, an ASIC, a DSP, or a FPGA, etc., configured to, for example, process a measurement signal into the image of the object. Of course, the processing member 32 can be any suitably arranged hardware, software, or combination of hardware and software, that is capable of carrying out the functionality of the processing member 32 described herein.

Note that several analog and/or digital amplifying members may be provided in the electromagnetic imaging system 10, for example in the receiving block 16. These are, however, not shown in FIG. 1 for a better overview of the relevant parts.

Figure 2:
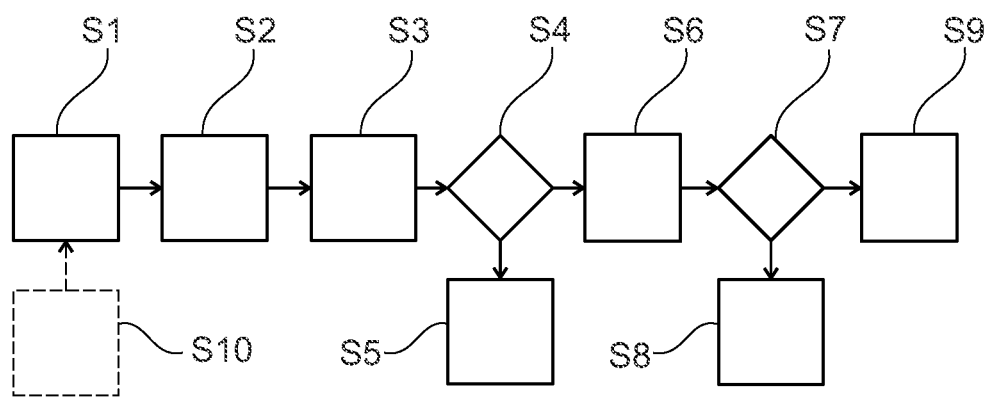
FIG. 2 shows a schematic flow chart of one embodiment of a method according to the disclosure.

A method for operating an electromagnetic imaging system, for example the electromagnetic imaging system 10 described above, is described in the following with reference to FIGS. 2, 3a and 3b.

First, radio frequency signals are generated and transmitted via the transmit antennas 14 at several planned times (step S1), namely with at least one planned frequency corresponding to the at least one predetermined frequency. These radio frequency signals are directed to the object 12, which object 12 then alters the properties of at least part of the radio frequency signals by reflecting, transmitting, attenuating and/or bending the radio frequency signals. From this modification of the properties of the radio frequency signals, an image of the object 12 may be reconstructed.

Next, the radio frequency signals are received via the multiple receive antennas 18 and a corresponding measurement signal is generated (step S2). In order to ensure that the measurement signal is not corrupted by an interference signal, the measurement signal is scanned for such an interference signal via the first detector 24 (step S3).

Via the first detector 24, the interference signal is analyzed with regards to frequency and/or power level and then compared to expected properties of the measurement signal (step S4), e.g., to an expected frequency and/or an expected power level of the measurement signal.

There may be two different outcomes of this comparison. A first outcome is that the interference signal is relevant, e.g., it would have a considerable influence on the imaging procedure. This is the case if the frequency of the interference signal is close to the at least one planned frequency, such that standard bandpass filters cannot reliably remove the perturbations, and if the power level of the interference signal exceeds a certain power level threshold, e.g., if it is of the same magnitude or even greater as the expected power level of the measurement signal.

A second outcome is that the interference signal is irrelevant, e.g., it would not have a considerable influence on the imaging procedure and thus may be ignored. This is the case if the frequency of the interference signal is significantly different from the at least one planned frequency and/or the power level of the interference signal is significantly smaller than the expected power level of the measurement signal.

If the outcome of the comparison is that the interference signal is relevant, the interference detection unit may send a control signal to the control unit 17, which in turn then at least one of delays, replans and reschedules the imaging procedure (step S5). Thereby, the term replan is to be understood to include changing operational characteristics of the electromagnetic imaging system 10, for example changing the planned frequency and/or the power level of the radio frequency signal generated by the multiple transmit antennas 14.

Put in other words, if the interference detection unit detects an interference signal that is capable of considerably disturbing the imaging procedure, the imaging procedure is changed such that the effect of the interference signal on the image created is minimized. For example, the imaging procedure is delayed until the interference signal is gone or weak enough to not further considerably disturb the imaging procedure. Alternatively or additionally, a user is informed about the interference signal detected. In another example, the frequency of the generated radio frequency signals may be adapted to substantially differ from the frequency of the interference signal, such that the interference signals influence on the imaging procedure is attenuated. Alternatively or additionally, the power level of the generated radio frequency signal may be enhanced to significantly exceed a power level of the interference signal.

In some embodiments, the parts of the measurement signal that are found to be corrupted by the interference signal may be discarded. This means that measurement signals generated at times at which relevant interference signals are detected are discarded. For this purpose, time stamps may be assigned to the measurement signal.

If the interference signal persists for a period that exceeds a certain time threshold, e.g., one second, the whole imaging procedure may be restarted.

If the outcome of the comparison is that there is no relevant interference signal, the measurement signal is modulated (sampled) with an internal oscillator signal of predefined frequency via the mixing members 21 (step S6). The result is a modulated measurement signal with an internally used intermediate frequency equal to the absolute value of the difference of the frequencies of the measurement signal and the internal oscillator. For example, the internally used intermediate frequency lies within a range of up to 100 MHz.

In step S6, the measurement signal may be digitized, such that the modulated measurement signal is a digital one. Moreover, an anti-aliasing filter 34 (See FIGS. 3a and 3b) may be applied such that a bandwidth of the internally used frequencies is restricted to a predefined range, for example 100 MHz.

Via the second detector 26, the modulated measurement signal is now analyzed with regards to frequency and/or power level and then compared to expected properties of the modulated measurement signal (step S7). Step S7 proceeds analogous to step S4, but with the difference that the frequency of the interference signal is compared to the internally used intermediate frequency and not to the planned frequency of the radio frequency signals.

Accordingly, if the outcome of the comparison in step S7 is that the interference signal is relevant, the interference detection unit 23 may send a control signal to the control unit 17, which in turn then at least one of delays, replans and reschedules the imaging procedure (step S8), analogously to step S5.

For example, if the detected interference signal corresponds to a radio frequency of about 15 GHz, the frequency of the radio frequency signals generated via the transmit antennas 14 may be adapted to about 30 GHz and the processing unit 22 may be switched to the second channel. This way, the influence of the interference signal on the imaging procedure is eliminated.

Figure 3A:
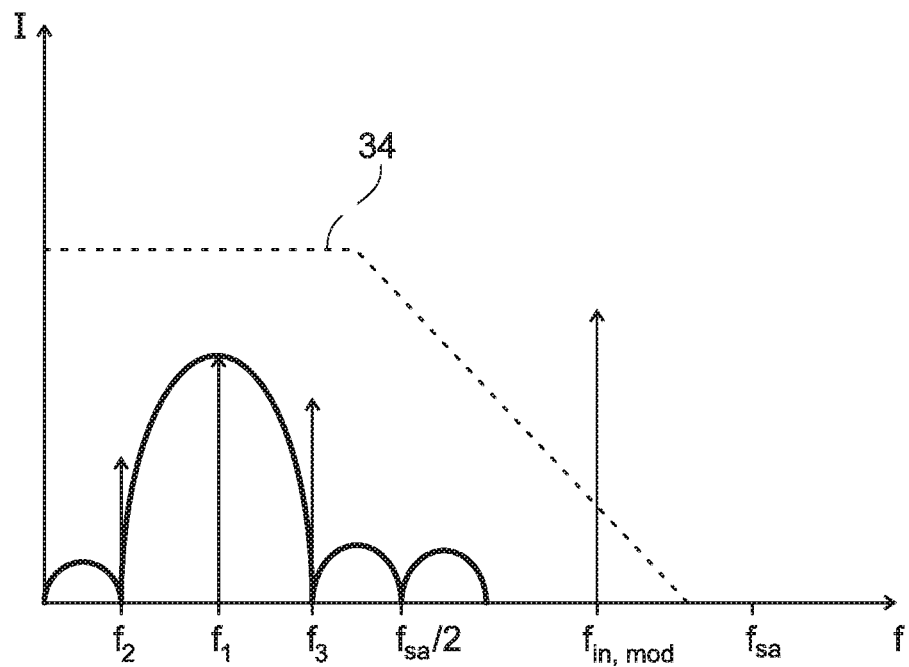
FIGS. 3a and 3b show two different plots of signal intensities versus frequency.
Figure 3B:
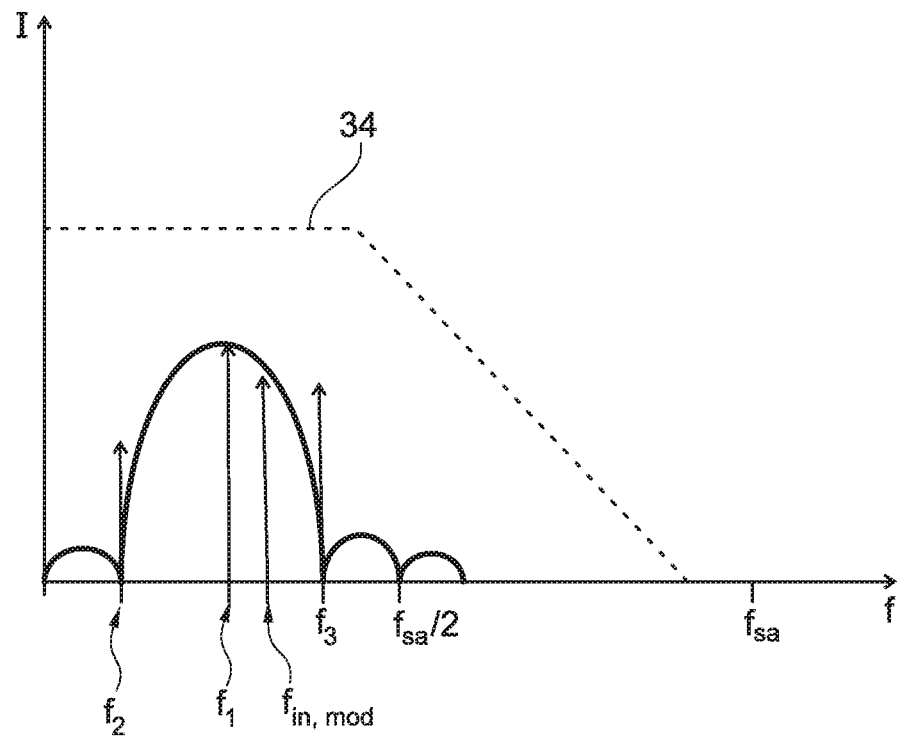

This outcome is illustrated in FIG. 3b, which shows a diagram of signal intensity plotted versus frequency. There, several signals with internally used intermediate frequencies $f_1$, $f_2$ and $f_3$ are shown, which respectively correspond to a measurement signal with a certain frequency. Moreover, a relevant interference signal with frequency $f_{in,mod}$ is shown. The frequency $f_{in,mod}$ of the interference signal is close to the intermediate frequencies $f_1$, $f_2$ and $f_3$ and the power level of all signals is of similar magnitude.

If, however, no relevant interference signal is found in the modulated measurement signal, the modulated measurement signal may be processed into an image of the object 12 via the processing unit 22.

This situation is illustrated in FIG. 3a, where the frequency $f_{in,mod}$ of the interference signal is significantly different from the frequencies $f_1$, $f_2$ and $f_3$. In the case shown, the interference signal is partially cut off by the anti-aliasing filter 34 and may possibly be ignored, depending on a remaining power level of the partially cut off interference signal.

Interference signals with a frequency outside of the bounds provided by the anti-aliasing filter 34 are filtered out completely, and can therefore be ignored.

Optionally, step S4 and/or step S7 are already performed once before the radio frequency signals are generated (step S10). This way, the imaging procedure only is started if no relevant interference signal is present. Thus, the computing resources necessary to generate the image can be saved.

Moreover, step S4 and/or step S7 may be repeated with a sampling frequency $f_{sa}$ that is based on a maximum internally used intermediate frequency. By adjusting the sampling frequency $f_{sa}$, it can be ensured that only a certain maximum number of measurement signals may be corrupted by an interference signal until the interference signal is detected. Preferably, the sampling frequency $f_{sa}$ is at least twice as big as the maximum internally used intermediate frequency, such that it is ensured that no corrupted measurement signal remains undetected.

In the example given above, the maximum internally used frequency is 100 MHz, such that the sampling frequency $f_{sa}$ should be at least 200 Mhz.

The control unit 17 may include, in some embodiments, logic for implementing the technologies and methodologies described herein, for example, controlling at least the one or more transmit antennas 14, changing the transmission frequency of the antennas 14, delaying an imaging procedure, replanning an imaging procedure, rescheduling an imaging procedure and excluding results of an imaging procedure based on a control signal received from the interference detection unit, etc. This logic of the control unit 17 can be carried out in either hardware or software, or a combination of hardware and software. In some embodiments, the control unit 17 includes one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof.

In an embodiment, the control unit 17 includes a microprocessor and a memory storing logic modules and/or instructions, that when executed by the microprocessor carry out the technologies and methodologies described herein. In an embodiment, the control unit 17 includes one or more ASICs having a plurality of predefined logic components. In an embodiment, the control unit 17 includes one or more FPGA having a plurality of programmable logic components. In an embodiment, the control unit 17 includes hardware circuit implementations (e.g., implementations in analog circuitry, implementations in digital circuitry, and the like, and combinations thereof). In an embodiment, the control unit 17 includes combinations of circuits and computer program products having software or firmware instructions stored on one or more computer readable memories that work together to cause the control unit to perform one or more methodologies or technologies described herein.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. An electromagnetic imaging system for creating an image of an object, comprising:
    at least one transmit antenna being configured to generate radio frequency signals with at least one planned frequency at several planned times;
    multiple receive antennas being configured to receive radio frequency signals and to generate a corresponding measurement signal;
    a control unit being configured to control at least the at least one transmit antenna,
    a processing unit being configured to process the measurement signal into the image of the object; and
    an interference detection unit being configured to detect and analyze an interference signal in the measurement signal, and the interference detection unit being connected in electrical communication with the control unit so as to control the control unit.

2. The electromagnetic imaging system of claim 1, wherein the control unit is configured to at least one of delay an imaging procedure, replan an imaging procedure, reschedule an imaging procedure and exclude results of an imaging procedure based on a control signal received from the interference detection unit.

3. The electromagnetic imaging system of claim 1, wherein the interference detection unit is configured to determine a power of the interference signal.

4. The electromagnetic imaging system of claim 3, wherein the interference detection unit is configured to determine whether the power of the interference signal exceeds a certain power level.

5. The electromagnetic imaging system of claim 1, wherein the interference detection unit is configured to compare the frequency of the interference signal with at least one of the at least one planned frequency and an internally used intermediate frequency corresponding to the at least one planned frequency.

6. The electromagnetic imaging system of claim 1, wherein the interference detection unit comprises at least one detector being configured to detect at least one characteristic of the interference signal.

7. The electromagnetic system of claim 6, wherein the at least one detector is provided in a radio frequency portion of the electromagnetic imaging system.

8. The electromagnetic imaging system of claim 6, wherein the at least one detector is provided in an intermediate frequency portion of the electromagnetic imaging system.

9. The electromagnetic imaging system of claim 1, wherein the control unit is configured to change the at least one planned frequency.

10. The electromagnetic imaging system of claim 1, wherein the at least one transmit antenna is configured to also receive radio frequency signals.

11. A method for operating an electromagnetic imaging system for creating an image of an object, comprising:
    at least one transmit antenna being configured to generate radio frequency signals with at least one planned frequency at several planned times;
    multiple receive antennas being configured to receive radio frequency signals and to generate a corresponding measurement signal;
    a control unit being configured to control at least the at least one transmit antenna;
    a processing unit being configured to process the measurement signal into the image of the object; and
    an interference detection unit being configured to detect and analyze an interference signal in the measurement signal, and
    the interference detection unit being connected in electrical communication with the control unit so as to control the control unit, with the following steps:
        receiving radio frequency signals via at least one of the multiple receive antennas and generating a corresponding measurement signal;
        detecting and analyzing an interference signal in the measurement signal; and
        at least one of delaying an imaging procedure, replanning an imaging procedure, rescheduling an imaging procedure and excluding results of an imaging procedure based on properties of the interference signal detected.

12. The method of claim 11, wherein the step of detecting an interference signal is repeated with a frequency corresponding to an intermediate frequency internally used by the electromagnetic imaging system.

13. The method of claim 11, wherein a power level of the interference signal is determined and compared to a power level threshold.

14. The method of claim 11, wherein a frequency of the interference signal is determined and compared with at least one of the at least one planned frequency and an internally used intermediate frequency corresponding to the at least one planned frequency.

15. The method of claim 11, wherein measurement signals are discarded which are generated at a time at which an interference signal with certain properties is detected.

16. The method of claim 11, wherein the interference signal is detected in a radio frequency portion of the electromagnetic imaging system.

17. The method of claim 11, wherein the interference signal is detected in an intermediate frequency portion of the electromagnetic imaging system.

18. The method of claim 11, wherein a first measurement is taken prior to generating radio frequency signals for imaging purposes.

19. The method of claim 11, wherein a first measurement is taken in at least one of a radio frequency portion of the electromagnetic imaging system in a range around the planned frequency and an intermediate frequency portion of the electromagnetic imaging system in a range around an internally used intermediate frequency corresponding to the planned frequency.

20. The method of claim 11, wherein replanning the imaging procedure comprises changing the frequency of the radio frequency signals generated via the at least one transmit antenna.

\* \* \* \* \*